US007246305B2

(12) United States Patent
Batres (10) Patent No.: US 7,246,305 B2
(45) Date of Patent: Jul. 17, 2007

(54) METHOD AND SYSTEM FOR PREVIEWING AND PRINTING CUSTOMIZED FORMS

(75) Inventor: Stefan R. Batres, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/009,656

(22) Filed: Dec. 10, 2004

(65) Prior Publication Data

US 2005/0102608 A1    May 12, 2005

Related U.S. Application Data

(63) Continuation of application No. 09/410,541, filed on Oct. 1, 1999, now Pat. No. 6,832,351.

(51) Int. Cl.
*G06F 17/21* (2006.01)
(52) U.S. Cl. .................................................... 715/500
(58) Field of Classification Search ................. 715/500
See application file for complete search history.

(56) References Cited

U.S. PATENT DOCUMENTS

| | | | | |
|---|---|---|---|---|
| 5,761,650 | A | * | 6/1998 | Munsil et al. ................. 705/34 |
| 5,963,925 | A | | 10/1999 | Kolling et al. ................. 705/40 |
| 6,006,242 | A | | 12/1999 | Poole et al. ................. 715/531 |
| 6,216,121 | B1 | | 4/2001 | Klassen .......................... 707/1 |
| 6,333,999 | B1 | | 12/2001 | Brownsmith ................. 382/229 |
| 6,405,221 | B1 | | 6/2002 | Levine et al. ............. 715/501.1 |
| 6,484,150 | B1 | | 11/2002 | Blinn et al. .................... 705/26 |

OTHER PUBLICATIONS dB Web Builder (ver. 1.0, Bluestem Technologies, 1997).
Camarada, Bill et al., Special Edition Using Microsoft Word 2000, Chapter 5-"Making the Most or Word's Proofing Tools- Counting a Document's Words, Pages, Lines, and Characters" (Que Corporation, 1999).

* cited by examiner

*Primary Examiner*—Doug Hutton
(74) *Attorney, Agent, or Firm*—Workman Nydegger (57) ABSTRACT

A method and system for previewing and printing customized pages, such as business forms including invoices and billing statements. An author-created template has HTML and OLE components (controls) placed on a page to define a visual representation of a class of object that is part of a database. The controls merge data from a selected current object of the database into the template, producing a visual representation of the object that is both viewable and printable. An extension to the present invention involves the use of multiple-page HTML to dynamically provide subsequent pages based on retrieved data. For example, if the data retrieved by the controls for an invoice is too large to display on a single invoice page, another HTML page, that is different from the first page of the invoice, would be automatically loaded as a template and the overflow data properly merged therewith.

30 Claims, 10 Drawing Sheets

METHOD AND SYSTEM FOR PREVIEWING AND PRINTING CUSTOMIZED FORMS

CROSS-REFERENCE TO RELATED APPLICATION

This is a continuation of U.S. patent application Ser. No. 09/410,541 filed Oct. 1, 1999 now U.S. Pat. No. 6,832,351.

TECHNICAL FIELD

The present invention generally relates to computer applications, and more particularly to the previewing and printing of computerized forms.

BACKGROUND OF THE INVENTION

Present financial and business application programs are limited in the business forms that they can print. For example, such applications typically provide a limited number of invoices and/or billing statements that can be selected by a user. In general, the user selects an appropriate form such as an invoice or reminder, inputs some customer information, and prints the form for sending to a customer.

Although different kinds of businesses need different kinds of forms, the forms provided by current applications are not very flexible or customizable. For example, in one application program, hard-coded templates are provided, from which the user selects a form that is most appropriate for the user's business. A slightly more customizable application program provides a dialog box for the user to choose the fields that the user wants to present in the business form. Although this enables some customization, the user is not permitted to edit or manipulate the fields that were chosen. Moreover, the user is unable to change colors or fonts, or remove or add text to the form.

However, one form is often more suitable than another for a particular business, even when considering only one type of business form. For example, a service business would not want the same type of invoice as a business that sold parts but provided no services, while yet another business would want to list both parts and labor on an invoice. Thus, although most businesses are dependent on the application program for its forms, the application program developers cannot foresee or efficiently provide enough varieties of forms to suit the many various types of businesses that exist.

A sophisticated user could, in theory, create customized forms or templates for use with these types of applications, but only if the user was familiar with the proper programming language and/or was capable of implementing that programming language to modify the selected form. For most businesses, a relatively advanced developer would be thus required for the creation of new or altered business forms. Most small businesses that use such an application program do not readily have access to such a skilled individual, and hiring one would be often cost prohibitive. Even if one or more skilled developers were available, however, the developers may have to perform a relatively major rewrite of the underlying code, depending on how the templates are filled in with customer data. In sum, business forms in financial and other business applications cannot be easily created, edited, and manipulated by a user or a third party.

SUMMARY OF THE INVENTION

Briefly, the present invention provides a method and system directed to the creation, editing and manipulation of customized pages for printout, especially business forms such as invoices and billing statements, and more particularly to the previewing and printing of such pages. An author creates a template in a straightforward manner by placing HTML (Hypertext Markup Language) and ActiveX/OLE components (client data controls) on a page to define a visual representation of that page. The client data controls may link to customer information maintained in a database. Via the controls, the system and method render a page with appropriate information, merging any data from a selected record (e.g., customer object) in the database into the template, such as to produce a business form that is both viewable and printable.

To accomplish the merging of arbitrary data with the template, a template data control is placed in the template to specify the type of database object that the template represents. To preview or print a page, a client (e.g., application) determines the location of a user-selected template, and creates an instance of an HTML renderer to load the template. Through an interface provided by the HTML renderer, the client control enumerates through the controls in the template to find the template data control by matching the data control's Interface ID (IID). The data control invokes the other client data controls (e.g., list or static) on the page to render an image corresponding thereto, after loading any relevant data (fields) from a recordset in the database that correspond to the user/client-selected current object. As the data is retrieved, the controls draw representations of the data via the HTML renderer, whereby the client may display or print the representation of the current object in the recordset, e.g., as a completed invoice.

An extension to the present invention involves the use of multiple-page HTML. For example, if the data retrieved by the controls for an invoice is too large to display on a single invoice page, another HTML page, that is different from the first page of the invoice, would be automatically loaded as a template and the overflow data properly merged therewith. A page spanning control is placed on the page, and includes information that spans multiple pages. Once the template is loaded, the template data control iterates through the elements in the document. The template data control determines what is the last page in the document relative to the beginning of the document and relative to the page spanning control. When the Page Spanning Control is initialized, it dispatches a notification informing how many pages it spans, whereby using this data, the template data control determines how many pages the document has.

The template data control sets the current page to be the first page in the document. Each time the current page is changed (by the template Data Control on behalf of the client), the template data control iterates through the document elements, inspecting their custom properties to determines whether the elements should be shown or hidden, and also dispatches notifications informing the controls linked thereto that the current page has changed. The page spanning control uses these notifications to update itself to show the new page.

Other objects and advantages will become apparent from the following detailed description when taken in conjunction with the drawings, in which:

DETAILED DESCRIPTION OF THE INVENTION

Exemplary Operating Environment

Figure 1:
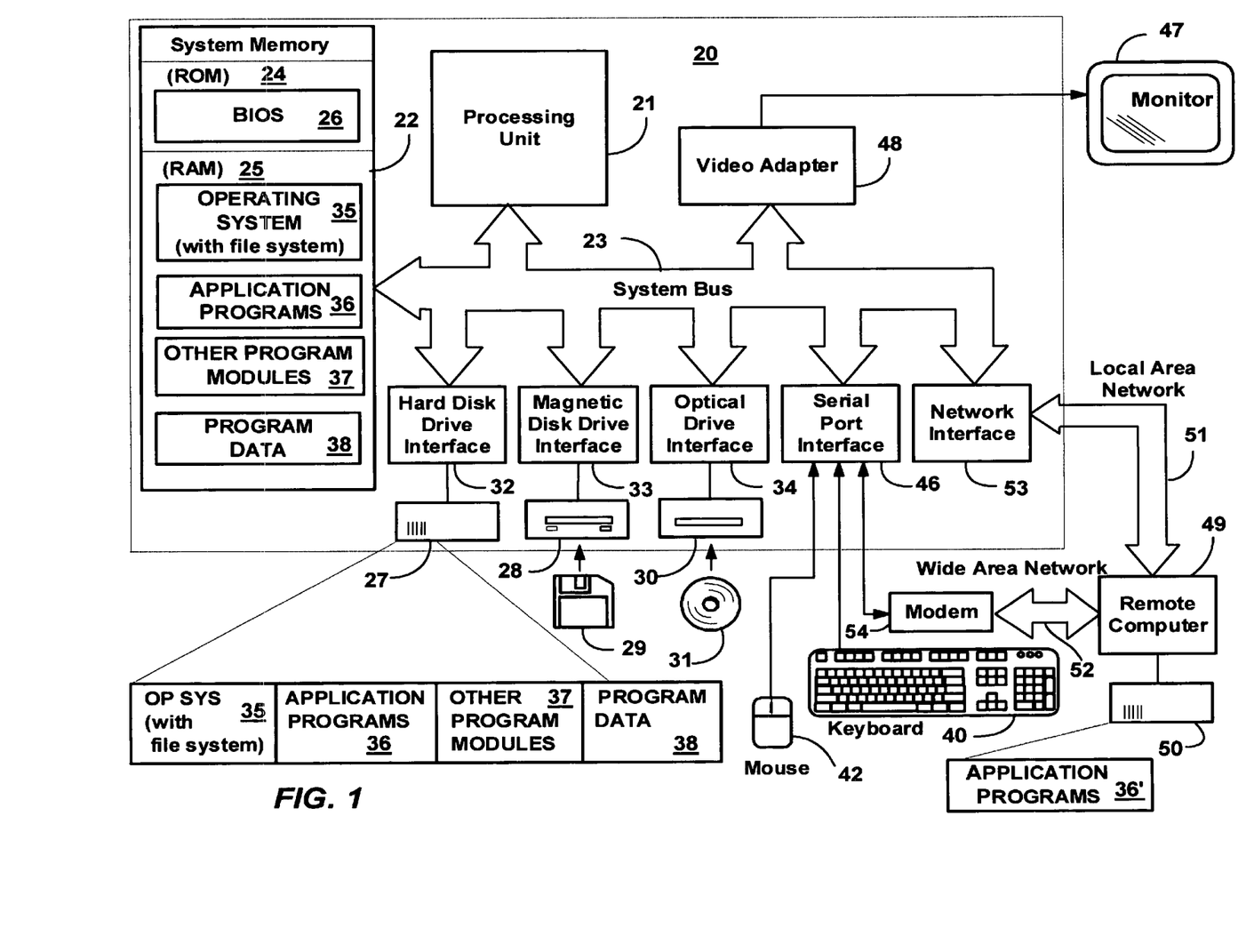
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT or Windows 98), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Previewing and Printing Customized Business Forms

The computing environment 20 described above may be used in connection with the system and method of the present invention to provide viewing and printing of customized pages, especially business forms such as invoices and billing statements. Notwithstanding, there is no intention to limit the present invention to business forms or to printing, but rather as will be understood, the present invention has numerous applications in computing, including rendering customized images on a screen, printing customized brochures, flyers, mailings, advertisements and so forth. In one embodiment, an author-created template has HTML and ActiveX (OLE) components placed on a page to define a visual representation of a class of object selected from a database. The system merges the data from a selected current object into the template, producing a visual representation of the object that is both viewable and printable. Note, however, there is no intention to limit the present invention to HTML, as virtually straightforward way to author a page with controls embedded therein, e.g., XML (Extensible Markup Language) or DHTML (Dynamic HTML) will suffice.

Figure 2:
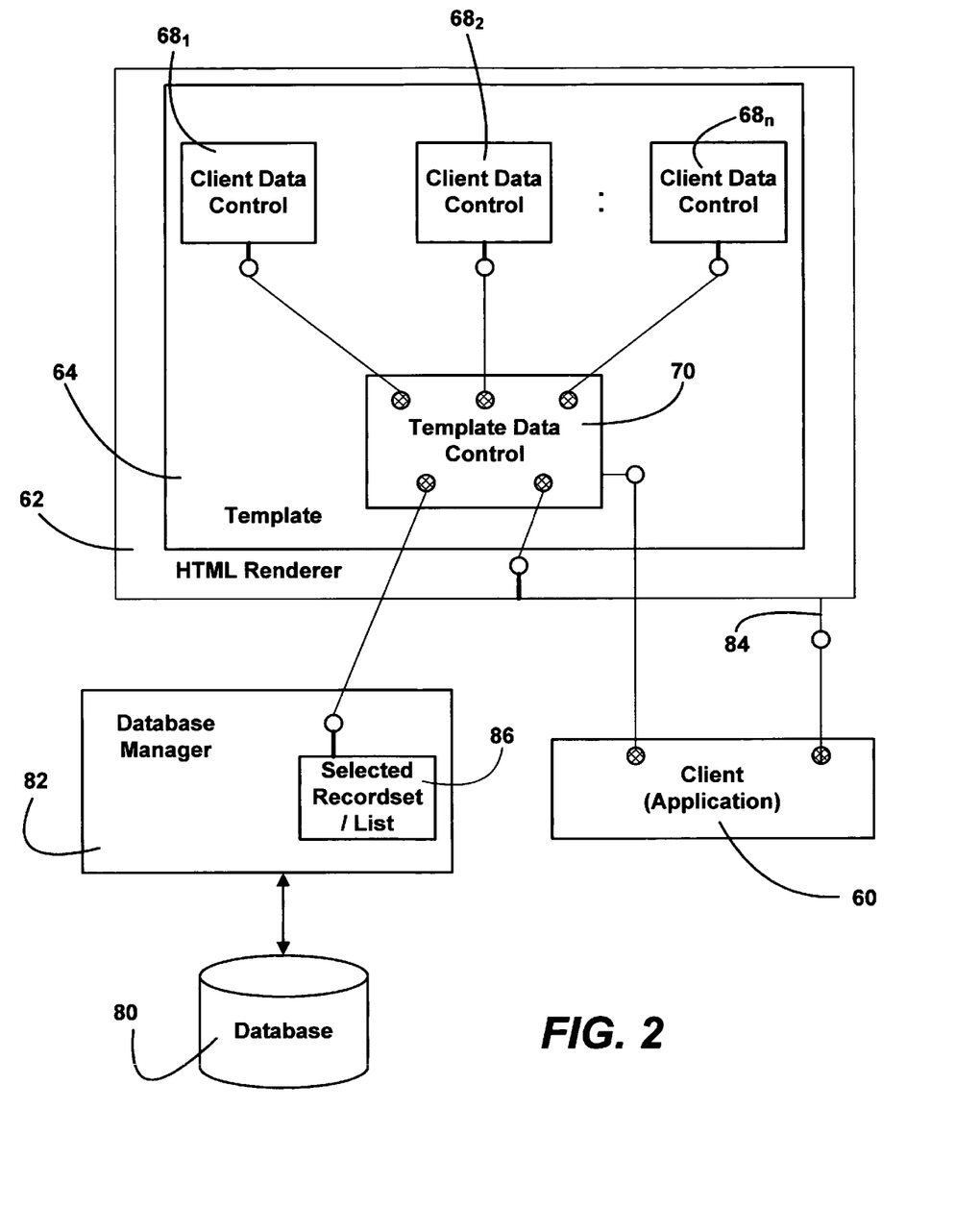
FIG. 2 is a block diagram representing a number of components in a computer system for implementing the creation of a business form in accordance with one aspect of the present invention.

In accordance with one aspect of the present invention and as represented in FIG. 2, a client (e.g., application program) 60 creates an instance of an HTML renderer 62 (e.g., one or more components of Microsoft Corporation's Internet Explorer) to load a template 64. The template 64 may be one of a plurality thereof selected by a user, and includes embedded (or linked) controls $68_1$-$68_n$ and 70 such as Microsoft Corporation's Active-X (OLE) controls identified in the HTML format or the like. As described below, the controls include one or more client data controls $68_1$-$68_n$ that represent static data (static control) or variable data (list control, or blank control), along with a template data control 70. As used herein, the term "client data control" generally represents a control that displays text and/or images, including, but not limited to, a list control or a static control. The template data control 70 provides certain functions (described below) to facilitate the operation of the present invention.

One client 60 may be (e.g., one or more components of) Microsoft Corporation's "Money Personal & Business" ("Money P&B") software application program. Alternative clients include Microsoft Corporation's "Investor," Microsoft Corporation's "TaxSaver", other financial, business, or general software (e.g., word processing, spreadsheet or database) applications that provide or intend to provide viewing or printing of pages such as business forms.

The HTML renderer 62 is preferably Microsoft Corporation's rendering engine used in Microsoft Corporation's Internet Explorer 4.0 and later versions. This particular rendering engine provides data manipulation, formatting, and content changes without dependency on a Web server. Enhanced programmatic access and control is provided for a user or for the provider of the client 60. For example, the location of objects and images can be precisely specified, and HTML tags, style sheets, text, tables, ActiveX controls, and applets can be dynamically modified without interaction with the Web server. By giving client-side scripting the capability to control the content and style of a Web page, responses to user interaction can be handled on the client's PC in a nearly instantaneous manner. As can be appreciated, alternative renderers may be used with the present invention.

As represented in FIG. 2, the template data control 70 may be linked to a database 80 (e.g., of customer records) by the client 60, or by specifying parameters therewith. The linking specifies information in the database 80 that underlies the template data control 70, i.e., the data control specifies what class of database object the template 64 represents. At present, there is one template data control per template, however it is feasible to have more than one, e.g., by separating the one template data control into multiple components. The static and/or list client data controls $68_1$-$68_n$ are linked to the template data control 70, such as to display fields related to the current database object of the template data control. In other words, the client data controls $68_1$-$68_n$ specify what data to display from the class of object specified by the template data control 70.

A suitable database 80 and database manager 82 (e.g., including a query engine) is provided by Microsoft Corporation's Open Financial Database ("OFD") technology. For example, OFD technology serves as the underlying data access engine and storage format for Microsoft Corporation's Money P&B and Money99 application programs, as well as a point of integration with "Investor," "TaxSaver," and a small number of third-party applications worldwide. The database manager 82 may be associated with one or more databases (although only one database 80 is represented in FIG. 2). As can be readily appreciated, however, the present invention may be used with virtually any database technology and/or other sources of data.

In accordance with an aspect of the present invention, at an appropriate time, such as when a user requests a print preview or print function, the client 60 finds the template data control 70 on the template through an interface 84 provided by the HTML renderer 62. More particularly, via the interface 84, a control or the like of the client enumerates through the various controls in the template to find the data control 70 by matching an interface identifier (IID) of the data control 70. Alternatively, the client 60 may include a browser, such as Microsoft Corporation's Internet Explorer 4.0 and later versions that could find the data control based upon its HTML ID. When located, the client 60 provides the data control 70 with the identity of a current recordset 86 of the database 80 (e.g., obtained by user selection or some automated process). For example, the database 80 may store recordsets for CustomerA-CustomerZ, and the user may select the recordset corresponding to CustomerR.

When the recordset 86 is identified, the data control 70 invokes each of the client data controls $68_1$-$68_n$ on the template 64. Each static control renders its corresponding static data (e.g., text or bitmaps), while each list (blank) control first generates an appropriate database query and obtains relevant data (fields) from the current recordset 86. Note that alternatively, the entire recordset may be retrieved and searched by each of the controls to find the corresponding field data. As the data is received, the blank controls draw representations of the retrieved data via the HTML renderer 62, whereby the client 60 can display or print the representation of the current, selected object in the record set.

Figure 3:
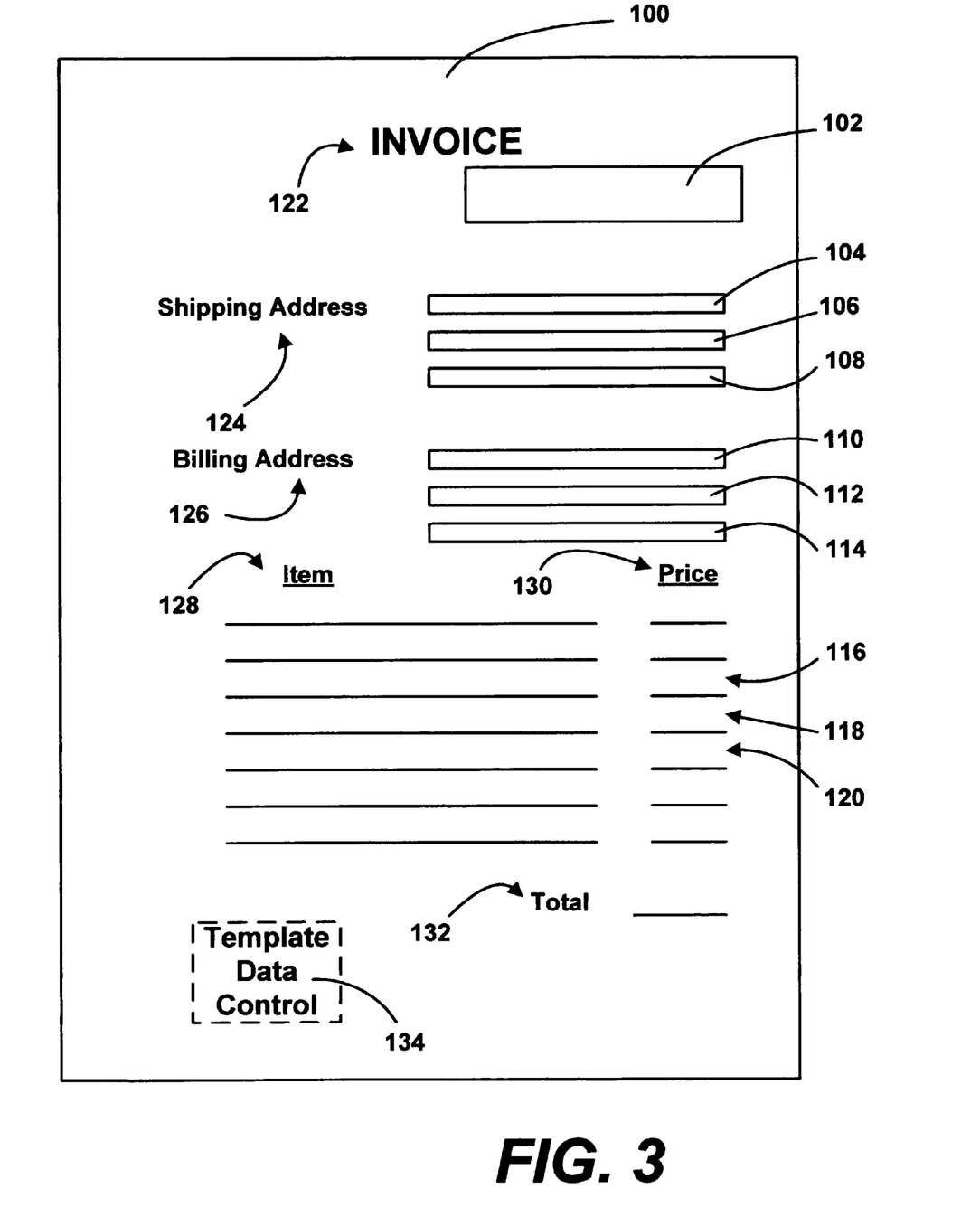
FIG. 3 is a diagrammatic representation of a template formed in accordance with one aspect of the present invention.

By way of example, a template 100 is represented in FIG. 3 showing a simple parts/products invoice. The template 100 includes a number of client data controls 102-132, including list (blank) controls 102-120 that are to be filled by data obtained by a query generated thereby. HTML text/image renderings in the form of static controls 122-132 are also represented in various locations on the template 100. As represented in FIG. 3 by a dashed box, a template data control 134 is embedded in the template 100, and is typically not visible when the representations of the data are drawn and/or printed via the HTML renderer 62.

As shown in FIG. 3, in the template 100 the blank control 102 represents a space for a customer name. Accordingly, when invoked by the template data control 134, the blank control 102 will generate a query to obtain customer name data based on the current recordset. When the customer name data (e.g., text) is returned, the blank control 102 will cause the customer name to be rendered via the HTML renderer 62.

The remaining blank controls 104-120 similarly obtain, fill in and render the appropriate image, typically in text, but not necessarily. For example, instead of a customer name, the customer's bitmap logo may be retrieved and rendered. Note that a single client data control could retrieve information for other client data controls, and pass that information to those other controls (e.g., through the template data control, or by serving as a container for other controls). For example, a control may obtain a customer name, address and telephone number in a single query, and pass the information to three individual controls, one related to name data, one to address data and one to telephone number data.

Using the HTML renderer 62 with the embedded controls in a template provides many benefits over prior art methods for viewing and printing business forms. Because a template formed by the present invention utilizes HTML or the like, components such as OLE/ActiveX controls, COM (component object model) and so forth can be embedded or linked to the template in a straightforward manner by an author without substantial programming skills. In addition, HTML provides a platform-independent method for describing a document in a bandwidth-efficient manner. HTML also provides rich formatting capabilities. Importantly, HTML documents may be authored and revisions made thereto without the aid of the developer, which saves significant expense in the development of new templates.

Figure 4:
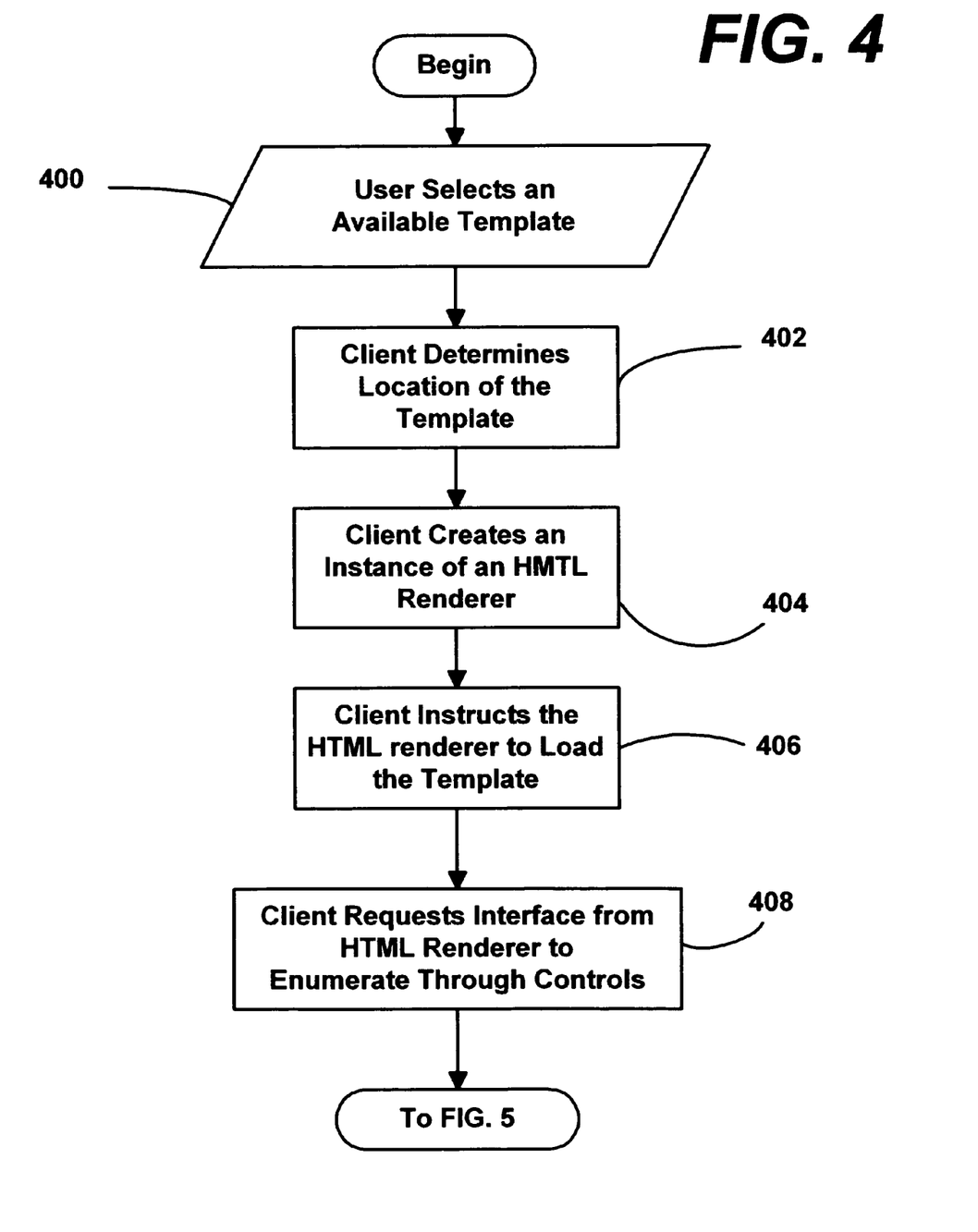
FIGS. 4-5 comprise a flow diagram generally representing the steps for creating the page in accordance with one aspect of the present invention.

The operation of the invention described thus far will now be described with reference to FIGS. 3-5. To load a template (e.g., the template 100 of FIG. 3), at step 400 of FIG. 4, a user or some process selects an available template from a set provided by the client application 60. For example, the client 60 may provide a popup window showing templates available for selection, whereby the user may select one via an input device such as the pointing device 42 (FIG. 1). At step 402, the client 60 determines the actual location of the related HTML file, e.g., a file of the local file system, a file on a network drive, or a file identified by a URL (Uniform Resource Locator), and the client 60 creates a moniker representing the template 100 to load.

At step 404, the client 60 instantiates (unless already instantiated) an instance of the HTML renderer 62. The client instructs the HTML renderer 62 to load the selected template 100 (step 406), e.g., the client binds the moniker to the HTML renderer 62. Loading the template 64 causes the controls 102-134 on the template 100 to be created, one at a time. Since there is no guaranteed order as to how the controls 102-134 are created, the client 60 does not necessarily know which of the controls 102-134 is the template data control 134. To find the template data control 134, at step 408 the client 60 requests the HTML renderer 62 for the interface 84 to enumerate through the various controls 102-134 of the template 100.

Figure 5:
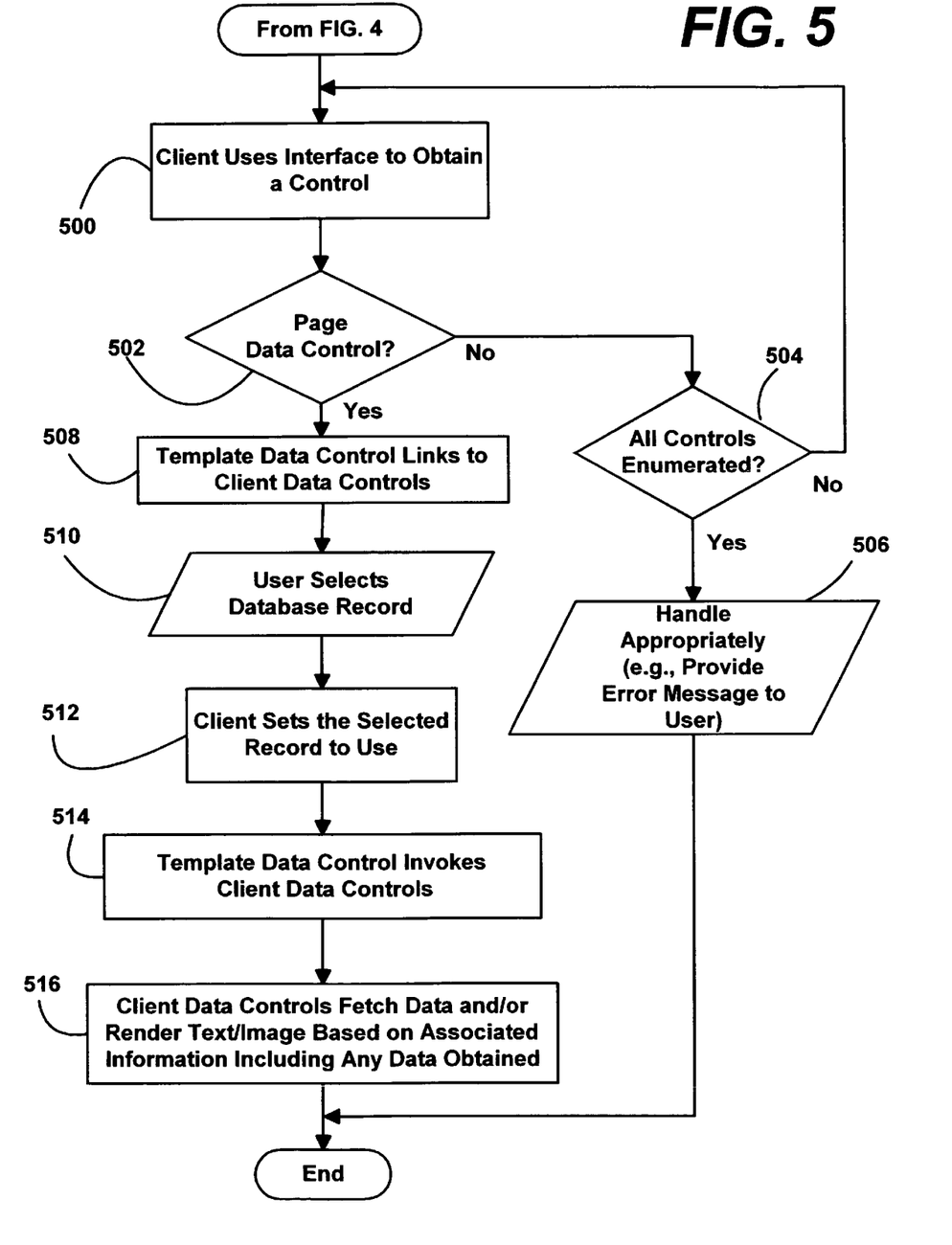

At step 500 of FIG. 5, the client 60 uses the interface 84 to obtain each of the controls, such as in an enumerated list thereof. As represented in FIG. 5 by steps 502-506, the client searches for the template data control 134, i.e., by matching the data control's interface identifier (IID) to one or more identifiers known to the client 60. If the proper template data control 134 is not found, the client 60 handles the situation appropriately, e.g., provides an error message to the user.

If the template data control 134 is found, at step 508 the client data controls linked thereto (by standard OLE connection points) are ready to be invoked to retrieve and/or render their appropriate data. Step 510 represents the user selection of a recordset, such as the recordset 86 in the database 80 corresponding to a particular customer for which the user would like a page displayed and/or printed. Of course, the user may have selected the recordset 86 earlier, for example, the user may select an invoice and a customer, print the invoice and then select some other form for that customer without reselecting the same customer. Moreover, the selection process may be automated, e.g., a user may select the invoice template along with a set of customers, whereby an invoice is automatically printed for each customer in the set. In any event, once the recordset 86 is selected, the client sets the recordset 86 to use (step 512), i.e., the client 60 informs the template data control 134 which recordset has been selected. At step 514, the template data control 134 invokes the client data controls via OLE connection points previously set up through the linking process. Each client data control then operates accordingly, e.g., list controls construct a query for the database manager 82 so as to get the appropriate data (fields) related to the selected recordset 86. The client data controls thus fetch the relevant data and/or render text or images associated therewith, as represented in step 516. Note that a number of fields may be present in the recordset for a give control, whereby the client data control fetches only the field it needs.

In some cases, the information to be printed exceeds the space limitations of one page. For example, an invoice may specifically list items purchased, whereby a relatively small customer order may receive a one-page invoice while larger customer orders will require more than one page to list the numerous items. To address recordsets of this size, the present invention provides a method and system for creating multiple-page HTML format documents. Note that HTML has no real notion of pages, pagination, and so forth.

In accordance with another aspect of the present invention, a specially-created control is utilized to permit a second page, or additional pages if necessary, of a template to be formed, such as when the data retrieved by the client data controls for the recordset are too large to display on a single page. The one or more additional HTML pages are rendered differently from the first page of the document. These additional pages are automatically loaded, and overflow data is properly merged therewith. For consistency, throughout this application, a template that supports multiple-pages will be referred to as a "multiple-page template" or a "document".

The present invention provides multiple-page template controls for handling retrieve data that may span multiple pages. The controls permit the method and system of the present invention to provide a multiple-page template that utilizes HTML both for the definition of the template and for rendering.

Figure 6:
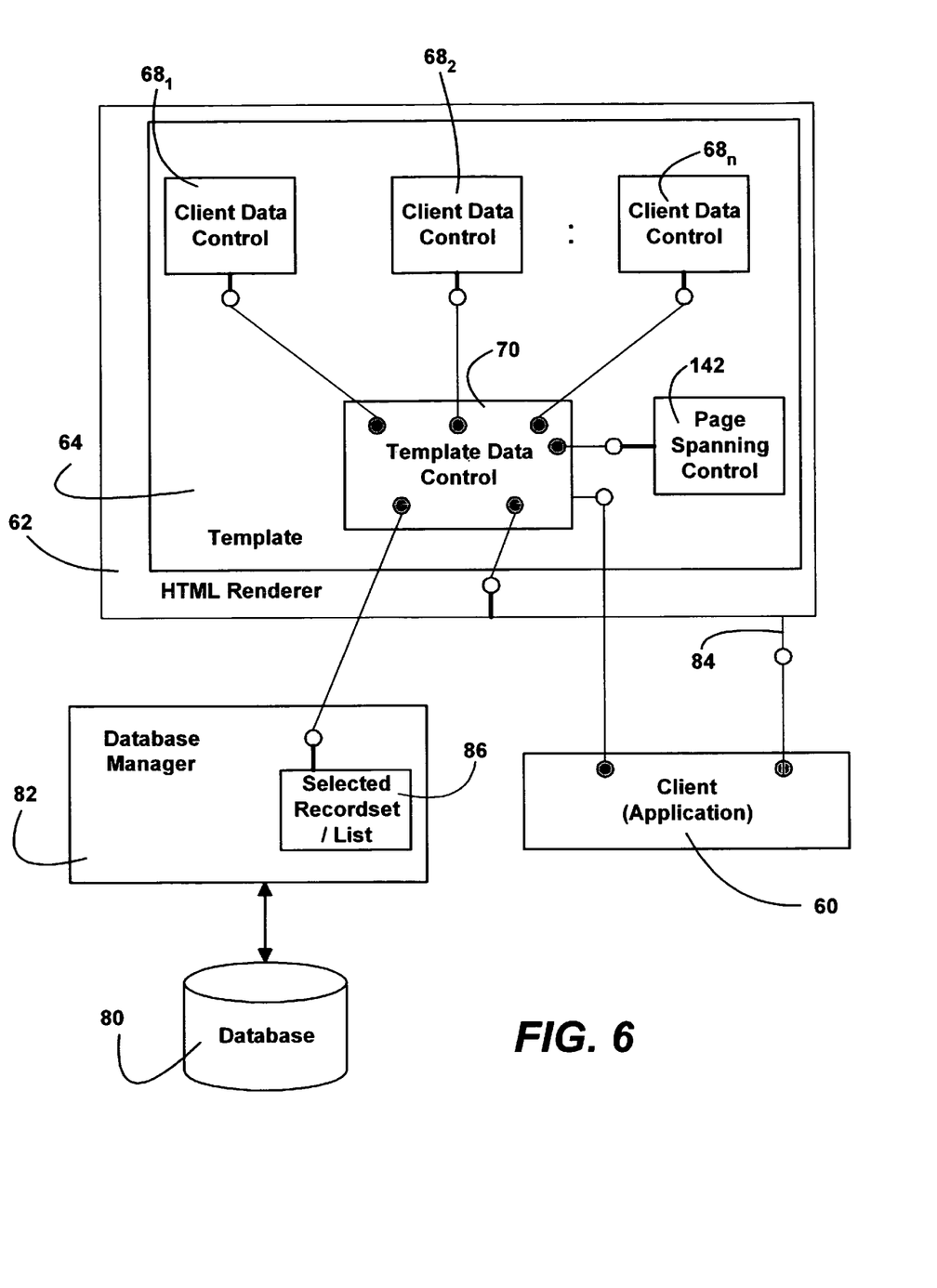
FIG. 6 is a block diagram representing a number of components in a computer system for implementing the creation of a business form on multiple pages in accordance with one aspect of the present invention.

FIG. 6 shows a representation of the components that are used to provide the multiple-page template. The system displayed in FIG. 6 includes several of the components of the system shown in FIG. 2. Like components in the two figures share like numerals, e.g., the template data control is represented by the numeral 70 in both FIG. 2 and FIG. 6. The like components in the two figures provide similar functions, but in FIG. 6, as described below, the template data control 70 adds page navigation and manages controls within the HTML renderer 62, to achieve a multiple-page template. A page spanning control 142 is also provided within the HTML renderer 62 (container), the function of which will be described in detail below. To avoid conflicts, there is only one page spanning control 142 in a multiple-page template.

An object model is a mechanism for accessing and programming a document or program. Microsoft Corporation's Document Object Model, available in "Internet Explorer" 5.0 and later, provides a structured model and logical interface for authors to access and update elements and attributes. The Document Object Model is a platform-neutral and language-neutral interface that permits script to access and update the content, structure, and style of a document. The Document Object Model includes a model for how a standard set of objects representing HTML and XML documents are combined, and an interface for accessing and manipulating the documents. Web authors can use the Document Object Model interface in Microsoft Corporation's "Internet Explorer" 5 and later to take advantage of this dynamic model.

Important advantages of the Document Object Model include the ability to access essentially everything in the document, the ability to make numerous content updates, and the ability to work with content in separate document fragments. The Document Object Model enhances a Web author's ability to build and manage complex documents and data. Many tasks, such as moving an object from one part of the document to another, are highly efficient and easy to perform using Document Object Model members.

Using the Document Object Model has many advantages for manipulating a document tree, i.e., a document with hierarchically arranged (e.g., nested) components. With the Document Object Model, content authors are able to move one part of the document tree to another without destroying and recreating the content, create elements and attach them to any point in the document tree and organize and manipulate new or existing tree branches in a document fragment before inserting the objects back into the tree. The ability to move a part of the document tree without destroying and recreating the content reduces the size of script and is more efficient. While the Document Object Model is suitable for operation of the present invention, other object models that are capable of accessing and manipulating data can be used with present invention.

By using the Document Object Model (DOM) 140 as described below, the data control 70 can selectively show and hide the client data controls $68_1$-$68_m$, HTML text, and images (collectively "DOM elements") in the document, depending on what the current page is and the location at which the DOM elements specify they should be shown. The DOM elements define on what pages they are shown in by using certain custom HTML properties, two of which are set forth below:

pageFirst: Determines the first page in the document in which the DOM element will be shown.
pageLast: Determines the last page in the document in which the DOM element will be shown.

Both of these properties may have the following possible values:

absolute: <##>: Means ## is a page number relative to the beginning of the document.
spanFirst: <##>: Means ## is a page number relative to the first page of the page spanning control, (described below)
spanLast: <##>: Means ## is a page number relative to the end of the page spanning control, (described below).

The page spanning control 142 determines in what page of the document it begins by using the pageFirst attribute with an absolute value. In one implementation, to communicate with the other controls within the container, the page spanning control 142 implements the IPageSpan interface and dispatches PageSpanEventSink notifications. In this implementation, controls implement a DataEventSink interface to receive notifications from the template data control 70. Other mechanisms (e.g., interprocess communication mechanisms) for communicating and providing/receiving notifications may alternatively be used. These interfaces are defined by the controls and/or elements within the container. By using these interfaces, the template data control 70 synchronizes itself with the page spanning control 142 to thereby correctly render all pages in the multiple-page template.

The operation of the multiple-page template portion of the present invention will now be described with reference to FIGS. 7-10. First, at step 700, a template (for example the template 144 of FIG. 10) is loaded by the client 60 and the HTML renderer 62, as described above. As described above, the client 60 enumerates the controls in the template 100 to locate a template data control 146. As represented at step 702, the template data control 146 determines if the HTML renderer 62 supports the Document Object Model, (or some similar, suitable model). In a present implementation described herein, if the Document Object Model is not supported, then multiple-page support is not enabled, and the template 144 is limited to a single page. The client 60 then handles this problem appropriately, e.g., provides an error message to the user (step 704).

Figure 7:
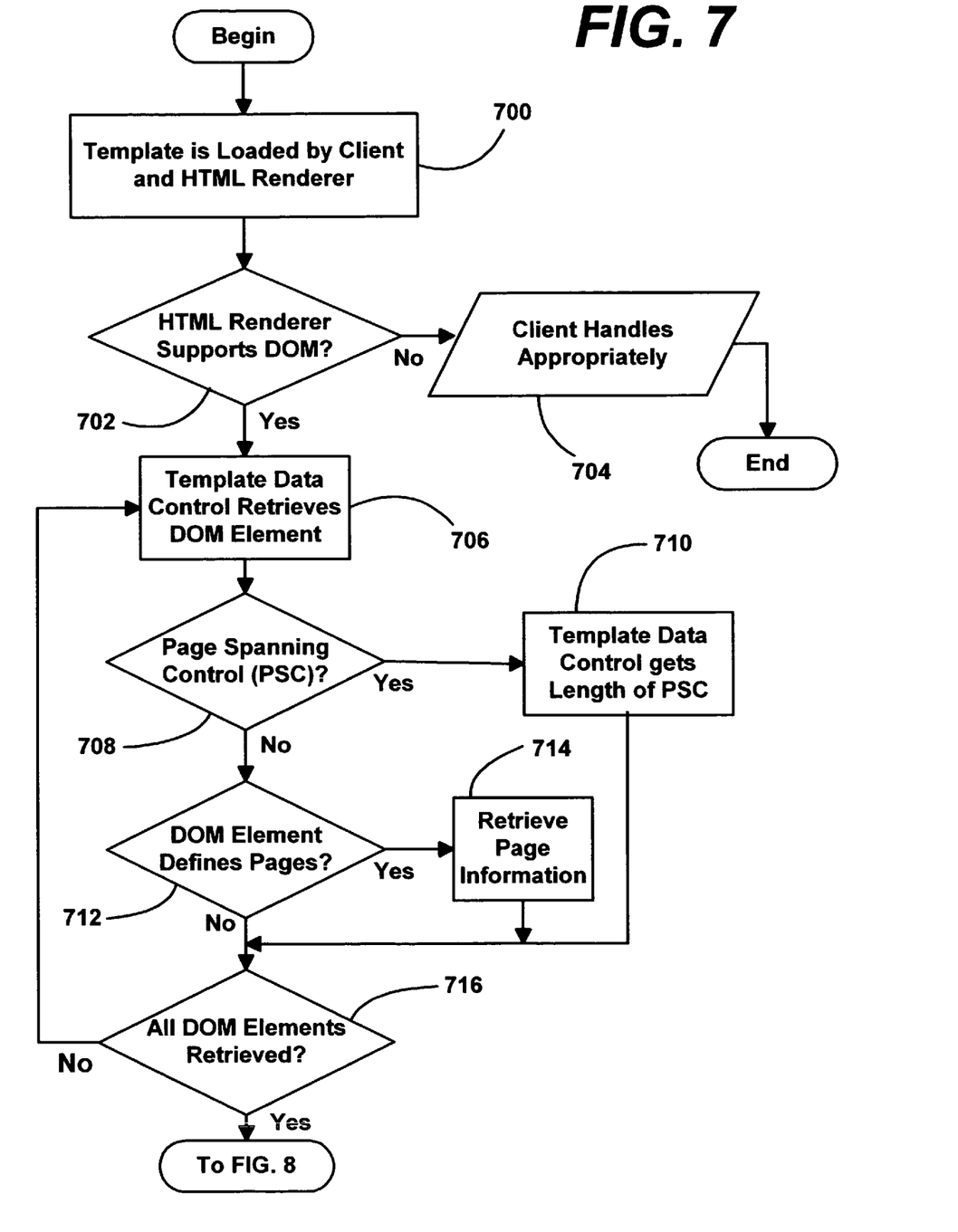
FIGS. 7-9 comprise a flow diagram generally representing the steps for creating a business form on multiple pages in accordance with one aspect of the present invention.

If the Document Object Model is supported, at steps 706-716 the data control 146 iterates through the DOM elements in the multiple-page template 144 to determine what is the last page in the document relative to the beginning of the document and relative to the Page Spanning Control. The template data control 146 determines the length (number of pages) of the page spanning control 142. More particularly, when the page spanning control 142 is initialized, it dispatches a notification informing the template data control 146 how many pages it spans. The data control 146 continues to retrieve DOM element information until it has iterated through each of the DOM elements in the multiple-page template.

Using the information retrieved from the DOM elements and the page spanning control 142, the data control 146 determines the number of pages within the multiple-page template. More particularly, the data control 146 uses two factors to determine the number of pages in the multiple-page template, one, the pages referred to by the individual DOM elements via custom properties, and two, the length of (number of pages spanned by) the page spanning control 142.

Figure 8:
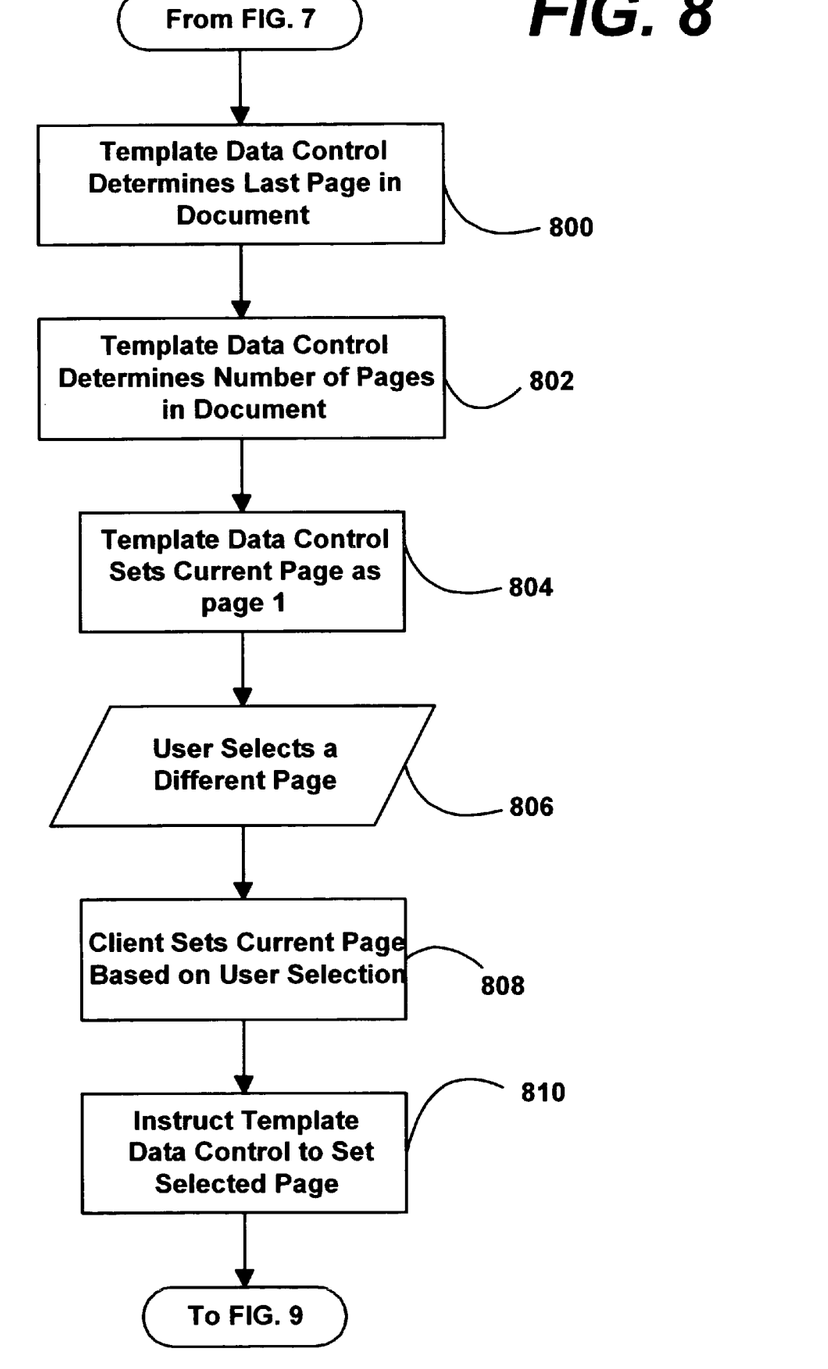

As represented by step 802, the template data control 146 determines the last page of the multiple-page template as defined by the individual DOM elements, and the last page the document as defined by the length of the page spanning control 142 (step 800). From this information, the template data control 146 determines the number of pages in the document (step 802).

At step 804, after the template data control 146 has determined the number of pages within the document, it sets the current page as page one (1). If the user wishes to view or print other pages of the document, the user selects a page through a user interface on the client 60 (step 806). At step 808, the client sets the current page based on the user's selection. The client 60 then instructs the template data control 146 to set the selected page (step 810).

Figure 9:
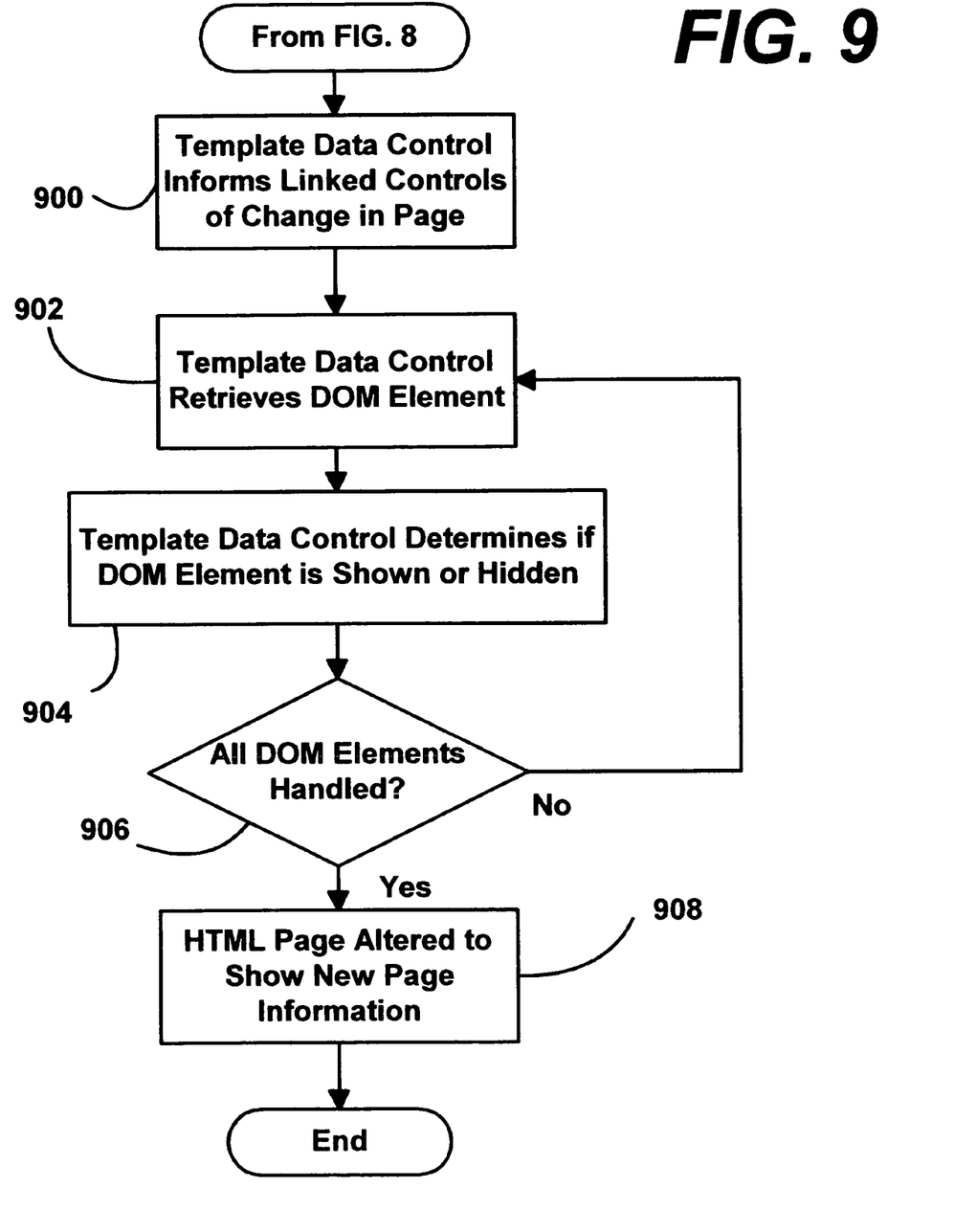

Using this instruction, at step 900 of FIG. 9, the template data control 146 informs the linked controls, including the page spanning control 142, of the new page. In keeping with the invention, the template data control 146 then enumerates through the DOM elements to determine whether the displayable DOM elements are to be shown or hidden on the selected page (steps 902-906).

Based on the retrieved information, if an individual DOM element is to be shown on the selected page, the DOM element fetches data as appropriate and/or renders its respective text/image on the selected page in the manner described above. On the other hand, if the DOM element is hidden on the selected page, then it is not shown on the page, and accordingly for efficiency, does not generate a query for obtaining data.

For ease of illustration, the following example is provided. In this example, a multiple-page template is provided with three elements:

A. <DIV pageFirst="absolute: 1" pageLast="absolute: 3">Some HTML here</DIV>

B. <DIV pageFirst="spanFirst: 2" pageLast="spanLast: −1">Some HTML here</DIV>

C. <OBJECT pageFirst=2 class="clsid:"></OBJECT>

In this example, element C is the page spanning control 142, as indicated by the presence of the page spanning control's class identifier (clsid) within the element. As can be seen from the example, the first page of the page spanning control 142 is page two (2).

The number of pages that the page spanning control spans is implementation dependant. A user implementing the page spanning control determines how many pages it spans. For example, the page spanning interface may be implemented by a client control that lists a list of bank transactions. The client control would determine how many lines fit on a page and decide how many pages are needed for an entire data set.

Element A is not defined relative to the page spanning control 142, but instead is defined relative to the beginning of the document with the defined property "absolute", as described above. The last page of element A is page 3, which is also described by the property "absolute", and thus is also defined relative to the beginning of the document and not the page spanning control 142.

Element B is defined relative to the page spanning control 142 (element C). Because its first and last pages are defined using the properties "spanFirst" and "spanLast", the first and last pages of element B are defined relative to the first page (page 2) and last page (to be determined) of the page spanning control 142, respectively. Since the first page of the page spanning control 142 is page two (2), and element B begins on the second page of the page spanning control, the first page of element B is page three (3) of the document.

As described above, once the page spanning control 142 figures out how many pages it needs, the data control 146 is ready to determine how many pages long the document is, and what elements to show on a given page. If, for example, element A spans six (6) pages, then the document is seven (7) pages long, because C (the page spanning control 622) starts on page 2 relative to the beginning of the document, and would also span six (6) pages. The following table describes in which pages each element is shown:

|         | Page |     |     |     |     |     |     |
|---------|------|-----|-----|-----|-----|-----|-----|
| Element | 1    | 2   | 3   | 4   | 5   | 6   | 7   |
| A       | Yes  | Yes | Yes | No  | No  | No  | No  |
| B       | No   | No  | Yes | Yes | Yes | Yes | No  |
| C       | No   | Yes | Yes | Yes | Yes | Yes | Yes |

The pages on which the elements A, B, and C are to be shown are defined in accordance with the properties defined above. As described above, element A is defined with a starting spanning page of page one (1) of the document, and an ending spanning page of page three (3) of the document. Element B begins at the second spanning page for the page spanning control 142 (page 3) and spans to the second to the last page of the page spanning control (page 6). Element C begins at the second page of the document and spans to the end of the document (page 7).

Figure 10:
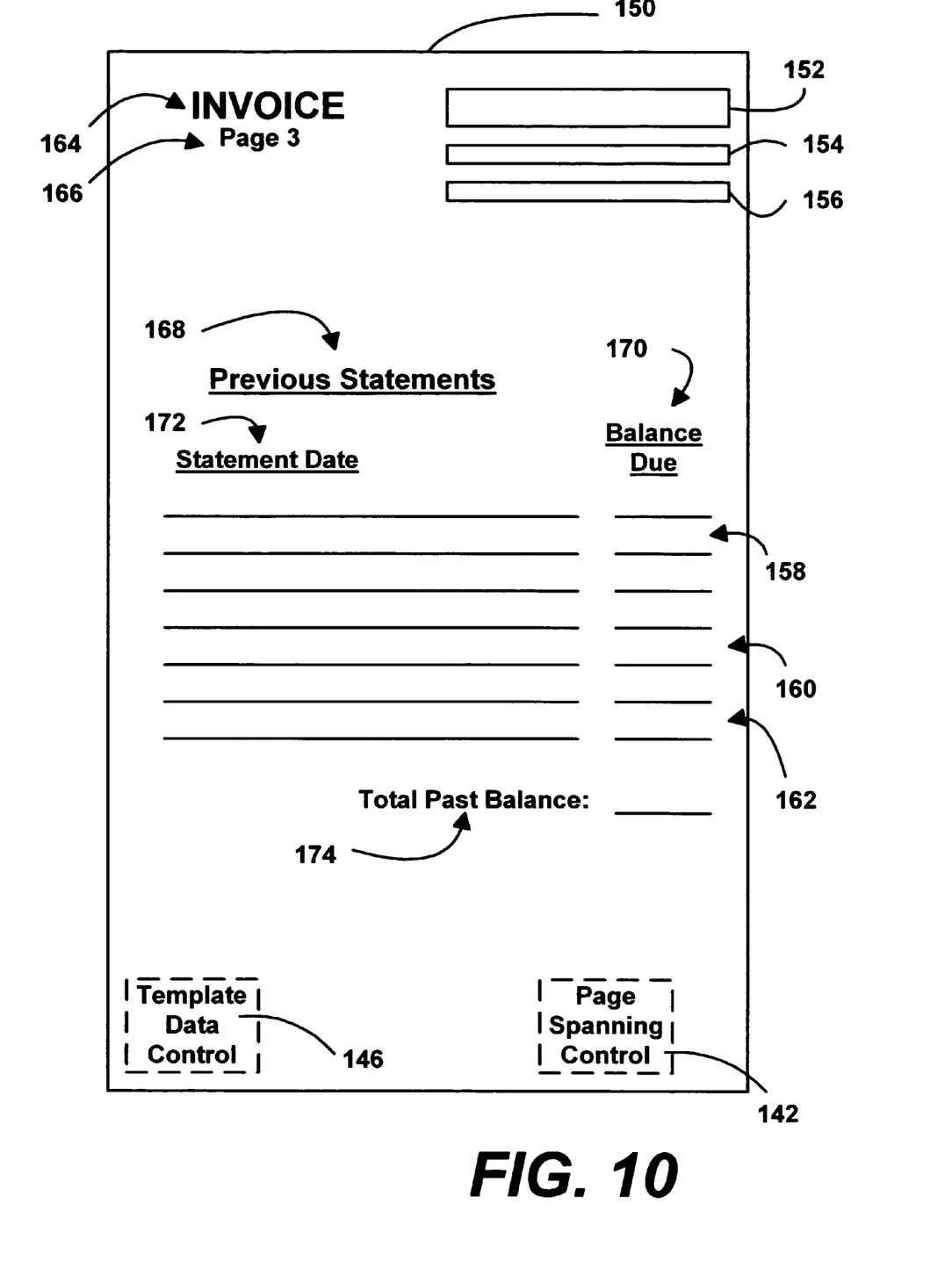
FIG. 10 is a diagrammatic representation of an additional page of a template formed in accordance with one aspect of the present invention.

FIG. 10 shows an example of a page (page 3) in the multiple-page template 150 beyond the first page. In this example, the first page corresponds to the template 100 shown in FIG. 3 as described above. Some DOM elements shown in the page 150 are also included in the first page of the template shown in FIG. 3. For example, one element, e.g., the client data control 102, represents the customer name. The field represented by this client data control is shown, for example, on pages 1-3 of the multiple-page template, similar to the page scan defined for element A in the example above. On the first page (FIG. 3), the customer name is presented above the address at the blank control 102. On page 3 (FIG. 10), the customer name is used in a portion of the header for the page, e.g., in the blank control 152.

Other blank controls 154-162 are embedded in the page 150, and can be appropriately filled in with data from the selected recordset 86. A number of hypertext bitmaps 164-174 are also embedded in the page 150. The data control 146 and the page spanning control 142 are embedded in the template and are not visible when the representations of the data are drawn or printed via the HTML renderer 62.

The DOM provides support for precisely locating the customer information at a selected location on each of the pages. Other information from elements within the multiple-page template 150 can be provided on some or all of the remaining pages of the document. In addition, some fields can be provided only on pages after the first page, such as the fields that fill some or all of the blank controls 154-160 on the page 150.

The multiple-page support feature of the present invention provides a manner in which HTML can be used to form a multiple-page template or other document. While a preferred embodiment is described with reference to creating an invoice with a multiple-page template, it is to be understood that method and system of the present invention could be used to form multiple page documents for a variety of applications. The page spanning control 142, along with the DOM, provides a unique manner of presenting data over a plurality of HTML pages. HTML provides enhanced formatting and display features, but can be programmed by a person with relatively minimal skills.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A computer-readable medium having computer-executable instructions for performing steps comprising:
    loading a template having a template data control, a page spanning control, and at least one client data control therein; locating the template data control;
    invoking the template data control, the template data control invoking each of the client data controls in the template;
    retrieving data corresponding to a current object via at least one of the client data controls;
    locating the page spanning control;
    invoking the page spanning control, the page spanning control providing page count information;
    invoking each of the client data controls in the template to retrieve properties regarding the page or pages upon which the retrieved data is to be rendered; and
    rendering a selected one of a plurality of pages representing the template and the data that was retrieved for the current object.

2. The computer-readable medium of claim 1, wherein rendering the page comprises interpreting HMTL.

3. The computer-readable medium of claim 2, wherein loading the template comprises instantiating an HTML renderer.

4. The computer-readable medium of claim 1, wherein locating the data control comprises enumerating controls within the template to find the data control.

5. The computer-readable medium of claim 1, wherein invoking the page spanning control comprises invoking the page spanning control via an object model.

6. The computer-readable medium of claim 1 comprising further computer-executable instructions for printing or displaying the rendered page.

7. The computer-readable medium of claim 1, wherein the template comprises a plurality of client data controls therein.

8. The computer-readable medium of claim 7, wherein the plurality of client data controls comprise at least one list control.

9. The computer-readable medium of claim 8 comprising further computer-executable instructions for generating a query at each of the list controls.

10. The computer-readable medium of claim 7, wherein the plurality of client data controls comprise at least one static control.

11. The computer-readable medium of claim 1 wherein the data retrieved by at least one client data control spans a plurality of pages, and comprising further executable instructions for representing the retrieved data for the respective client data controls on the respective page or pages of the template in accordance with the retrieved properties.

12. The computer-readable medium of claim 11, wherein locating the page spanning control comprises enumerating controls within the template to find the page spanning control.

13. The computer-readable medium of claim 1, having further computer-executable instructions for, receiving a notification of a changed page at the template data control, invoking each of the client data controls in the template to retrieve properties regarding the changed page upon which the retrieved data is to be rendered, and rendering the changed page representing the template and the data that was retrieved for the current object.

14. A method of providing for client-side scripting in order to permit a client to control content and style when rendering a page having database data represented thereon, the data corresponding to a current selection of the client, the method comprising:
    instantiating an HTML renderer;
    loading a template associated with a client application, the template having a template data control which comprises a page spanning control, and one or more author-placed client data controls therein;
    invoking the template data control, the template data control invoking at least one of the client data controls in the template;
    accessing at least one database via the at least one invoked client data control so as to retrieve data corresponding to the current selection, and if the data retrieved spans a plurality of pages, then
        invoking the page spanning control, the page spanning control providing page count information,
        invoking one or more of the client data controls in the template to retrieve properties regarding the pages upon which the retrieved data is to be rendered, and
        determining the representation of the retrieved data for the respective client data controls on the respective pages of the template in accordance with the retrieved properties;
    rendering one or more pages based on the template, the one or more pages including a representation of the data retrieved for the current selection by the client.

15. The method of claim 14, wherein each client data control is placed by a user of the client application.

16. The method of claim 1, wherein the current selection is made by a user of the client application.

17. The method of claim 1, wherein the template is provided with the client application.

18. The method of claim 1, wherein the template further comprises fixed data.

19. The method of claim 1, wherein rendering each page comprises interpreting HTML.

20. The method of claim 1, wherein locating the template data control comprises enumerating controls within the template to find the template data control.

21. The method of claim 1, further comprising printing the rendered one or more pages.

22. The method of claim 1, wherein locating the page spanning control comprises enumerating controls within the template to find the page spanning control.

23. The method of claim 22, wherein invoking the page spanning control comprises invoking the page spanning control via an object model.

24. A computer-readable medium having computer-executable instructions for implementing a method of providing for client-side scripting in order to permit a client to control content and style when rendering a page having database data represented thereon, the data corresponding to a current selection of the client, and wherein the method comprises:
    instantiating an HTML renderer;
    loading a template associated with a client application, the template having a template data control which comprises a page spanning control, and one or more author-placed client data controls therein;
    invoking the template data control, the template data control invoking at least one of the client data controls in the template;

accessing at least one database via the at least one invoked client data control so as to retrieve data corresponding to the current selection, and if the data retrieved spans a plurality of pages, then invoking the page spanning control, the page spanning control providing page count information, invoking one or more of the client data controls in the template to retrieve properties regarding the pages upon which the retrieved data is to be rendered, and determining the representation of the retrieved data for the respective client data controls on the respective pages of the template in accordance with the retrieved properties;

rendering one or more pages based on the template, the one or more pages including a representation of the data retrieved for the current selection by the client.

25. The computer-readable medium of claim 24, wherein rendering the page comprises interpreting HTML.

26. The computer-readable medium of claim 24, wherein at least one client data control is a list control that generates a query.

27. The computer-readable medium of claim 24, wherein the one or more client data controls comprise at least one static control.

28. The computer-readable medium of claim 24, wherein locating the template data control comprises enumerating controls within the template to find the template data control.

29. The computer-readable medium of claim 28 wherein invoking the page spanning control comprises invoking the page spanning control via an object model.

30. The computer-readable medium of claim 24 comprising further computer-executable instructions for printing the one or more rendered pages.

* * * * *